US011361262B2

United States Patent
Leng et al.

(10) Patent No.: US 11,361,262 B2
(45) Date of Patent: Jun. 14, 2022

(54) BLOCKCHAIN-ENABLED EDGE COMPUTING METHOD FOR PRODUCTION SCHEDULING

(71) Applicant: GUANGDONG UNIVERSITY OF TECHNOLOGY, Guangzhou (CN)

(72) Inventors: Jiewu Leng, Guangzhou (CN); Alan Zhou, Guangzhou (CN); Qiang Liu, Guangzhou (CN); Guolei Ruan, Guangzhou (CN); Shide Ye, Guangzhou (CN); Jianbo Jing, Guangzhou (CN); Hu Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 51 days.

(21) Appl. No.: 17/060,148

(22) Filed: Oct. 1, 2020

(65) Prior Publication Data
US 2021/0256438 A1   Aug. 19, 2021

(30) Foreign Application Priority Data
Feb. 18, 2020   (CN) .......................... 202010098365.8

(51) Int. Cl.
*G06Q 10/06* (2012.01)
*G16Y 10/25* (2020.01)
(Continued)

(52) U.S. Cl.
CPC ....... *G06Q 10/06311* (2013.01); *G06Q 50/04* (2013.01); *G16Y 10/25* (2020.01); *G16Y 40/35* (2020.01)

(58) Field of Classification Search
CPC ......... G16Y 10/00–40/00; G06Q 10/00–50/00
(Continued)

(56) References Cited

U.S. PATENT DOCUMENTS 10,326,766 B2   6/2019   Egner et al.
10,346,406 B2 *  7/2019   Booz ................. G06Q 20/0855
(Continued)

FOREIGN PATENT DOCUMENTS

| CN | 109194761 A | 1/2019 |
| CN | 109302405 A | 2/2019 |

OTHER PUBLICATIONS http://web.archive.org/web/20190726223144/https://en.wikipedia.org/wiki/Edge_computing (Year: 2019).*

*Primary Examiner* — Alan S Miller

(57) ABSTRACT

Disclosed is a blockchain-enabled edge computing method for production scheduling. The method includes modeling a smart contract between a device and a manufacturing unit, and using the smart contract to perform production scheduling on the device inside the manufacturing unit; one of the manufacturing units includes multiple devices; mounting each device on the blockchain operating node, the MES issues production instructions to the nodes of each manufacturing unit, at the same time, the nodes acquire production data of the device through multiple data sources of the device, the operating state data and process parameter data of each device are acquired in real time, and the data is directly chained from the device level; according to the production instructions and device parameters obtained by the manufacturing unit, using edge computing to dynamically adjust the device load, efficiency, and utilization.

6 Claims, 3 Drawing Sheets

(51) Int. Cl.
*G16Y 40/35* (2020.01)
*G06Q 50/04* (2012.01)

(58) Field of Classification Search
USPC .............................................. 705/7.11–7.42
See application file for complete search history.

(56) References Cited

U.S. PATENT DOCUMENTS

| | | | |
|---|---|---|---|
| 10,747,201 B2* | 8/2020 | Biernat | G06F 16/248 |
| 2005/0165585 A1* | 7/2005 | Bhateja | G07C 3/146 |
| | | | 702/188 |
| 2007/0192128 A1* | 8/2007 | Celestini | G06Q 10/06 |
| | | | 705/35 |
| 2014/0358271 A1* | 12/2014 | Asakawa | G05B 19/402 |
| | | | 700/112 |
| 2017/0046709 A1* | 2/2017 | Lee | G06Q 20/367 |
| 2017/0279774 A1* | 9/2017 | Booz | G06Q 20/223 |
| 2017/0307387 A1* | 10/2017 | Kohlhepp | G05B 19/4155 |
| 2018/0341910 A1* | 11/2018 | Broveleit | G06Q 50/28 |
| 2019/0037012 A1* | 1/2019 | Stöcker | H04L 67/104 |
| 2019/0116128 A1 | 4/2019 | Guo et al. | |
| 2019/0340269 A1* | 11/2019 | Biernat | G06F 16/27 |
| 2020/0007540 A1* | 1/2020 | Kawaguchi | H04L 9/088 |
| 2020/0019137 A1* | 1/2020 | Tsai | G05B 19/4062 |
| 2020/0103859 A1* | 4/2020 | Ouyang | G05B 19/41865 |
| 2021/0166181 A1* | 6/2021 | Wang | G06Q 10/20 |

\* cited by examiner

BLOCKCHAIN-ENABLED EDGE COMPUTING METHOD FOR PRODUCTION SCHEDULING

CROSS-REFERENCE TO RELATED APPLICATIONS

This application claims priority to Chinese Patent Application No. 202010098365.8 with a filing date of Feb. 18, 2020. The content of the aforementioned applications, including any intervening amendments thereto, are incorporated herein by reference.

TECHNICAL FIELD

The disclosure relates to the technical field of blockchains, and more specifically, to a blockchain-enabled edge computing method for production scheduling.

BACKGROUND

As the manufacturing model is undergoing a process of shifting to the mass personalization, the traditional large-volume and specialized production lines are gradually shifting to small-volume and multi-variety, resulting in the obvious refinement of the existing product manufacturing division. Under this background, the current intelligent manufacturing system needs to be able to quickly perform production scheduling to produce products of various batches and similar features. When a series of similar products are to be produced, the optimization and accurate issuance of production instructions need to be realized immediately according to the production process and the parameters and loads of the corresponding production device. In the entire production scheduling process, it is necessary to achieve a rapid disturbance response, information security, optimization and selection and matching of various elements, and balance the device load with the most reasonable structure and method, so as to balance the load utilization of each device and maximize the utilization, and ultimately maximize the production efficiency.

Production scheduling needs to discover deviations in plan execution in time, quickly locate the cause of deviations, and be able to quickly perform an adjustment. However, the production process is complicated with many emergencies, and intelligent manufacturing systems often have features such as many production links, complex collaboration relationships, strong production continuity, and rapid changes in conditions. Once a production instruction cannot be completed on time, or a certain device fails, it is difficult to quickly perform the adjustment, and then affect the operation of the entire production system; because in the production scheduling process, the centralized system can issue production instructions after calculating and analyzing the global elements, so that the flexibility of production scheduling is poor. Once a failure or deviation occurs, it is difficult to quickly adjust the device load to maximize production efficiency; due to the complex conditions in the production process and the presence of malicious human tampering, the data reliability is poor, which may not necessarily reflect the true load of the device.

The existing manufacturing management and control system mainly uses a centralized system to calculate and issue production instructions based on global elements. Once the scale of manufacturing increases, the system will face the following problems: (1) intelligent realization which is optimized and analyzed based on global elements is difficult in terms of calculations, and due to the rapid changes in the state of resource elements and the long response time of global calculations, it cannot quickly adapt to changes, which may lead to the shutdown of the production system; (2) the accuracy of the production scheduling plan is low, because the production scheduling needs to calculate the elements based on the load of the device, but due to the possibility of network transmission problems and human malicious tampering, the accuracy of data at the manufacturing resource level is not high, so that the MES cannot accurately issue production tasks according to device parameters and load conditions during production scheduling; (3) in such scheduling situation, the device is generally unbalanced in load, resulting in low utilization of some device and excessive load on another device, which may easily lead to device failure.

SUMMARY

In view of the above shortcomings, in order to solve the problem of low accuracy of production scheduling, low flexibility, low data reliability, and poor traceability in the current production scheduling process, the disclosure proposes a blockchain-enabled edge computing method for production scheduling by introducing the blockchain and edge computing technology, which improves the efficiency of the overall production scheduling calculation, thereby realizing flexible and efficient production scheduling.

In order to achieve the above object of the disclosure, the technical solution is adopted as follows: a blockchain-enabled edge computing method for production scheduling, wherein the method comprises the steps of:

S1: modeling a smart contract between a device and a manufacturing unit, and using the smart contract to perform production scheduling on the device inside the manufacturing unit, wherein one of the manufacturing units comprises a plurality of devices;

S2: mounting each device on the blockchain operating node, wherein the Manufacturing Execution System (MES) issues production instructions to the nodes of each manufacturing unit, at the same time, the nodes acquire production data of the device through multiple data sources of the device, the operating state data and process parameter data of each device are acquired in real time, and the data is directly chained from the device level;

S3: according to the production instructions and device parameters obtained by the manufacturing unit, using edge computing to dynamically adjust the device load, efficiency, and utilization.

Preferably, in step S1, the smart contract is established according to the attributes of the manufacturing unit and the attributes of the device; wherein the attributes of the manufacturing unit comprise the name of the manufacturing unit, the number of the unit devices, the number of parts to be produced, the number of processing parts per minute, the expected makespan, and the processing efficiency; the attributes of the device comprise the name of the device, the number of the device, the number of processing parts per minute, the number of parts to be produced, the expected makespan, and the processing efficiency.

Preferably, in step S2, the operating state data comprises operating state signals, running, standby, failure, shutdown, and duration; the process parameter data comprises the current, temperature, and pressure of each process; the multiple data sources of the device comprise a frequency converter, a soft starter, a servo controller, and a control instrument.

Preferably, in step S3, the manufacturing unit receives production instructions issued by the MES system, and the node of the manufacturing unit assigns production tasks according to the current production efficiency of the device.

Preferably, in step S1, the manufacturing unit obtains device parameters as follows: in the production process of the manufacturing unit, sending the relevant operating parameters of the device to the smart contract through multiple data sources, calculating the current processing efficiency of the device according to the operating parameters uploaded by the device, obtaining the processing efficiency of the manufacturing unit in the process, and calculating whether the estimated makespan of the current manufacturing unit is the shortest in the smart contract, if not, requiring adjustment.

Further, the estimated makespan of the manufacturing unit=the maximum value of the estimated makespan of the device in the manufacturing unit, wherein the estimated makespan of the device=the number of parts to be produced/the number of processing parts per minute+the remaining processing time of the current production workpiece.

Further, the load of the edge computing dynamic adjusting device is specified as follows:

calculating the processing efficiency of the device according to the device parameters, and allocating the workpieces to be produced by the smart contract, so that the estimated processing time in the manufacturing unit is the shortest and the production efficiency of the manufacturing unit is maximized;

first calculating the estimated completion time ti of each device and the shortest estimated completion time T of the manufacturing unit; if $t_i<T$ in the device, increasing the number of workpieces to be processed until $t_i \geq T$, otherwise reducing the number of workpieces to be processed; finally $t_i \approx T$ in each device;

at the same time, if the processing efficiency of a certain device is lower than p, setting the device status as abnormal; if the load of the current manufacturing unit device is higher than a threshold k, feeding back to the MES for global production task scheduling.

The beneficial effects of the disclosure are as follows.

The disclosure uses the blockchain technology to improve the accuracy of issuing instructions and uploading data, and provides real data support for production scheduling. At the same time, an edge computing method is used to form the same type of devices into a manufacturing unit, and the device scheduling in the unit is performed using the edge computing method to dynamically and quickly balance the device load according to the real parameters of the device and the process, while reducing the computational complexity of the MES, and improving the efficiency of the overall production scheduling calculation, thereby realizing flexible and efficient production scheduling.

DESCRIPTION OF THE EMBODIMENTS

The disclosure will be described in detail hereinafter in conjunction with the drawings and specific embodiments.

Embodiment 1

In this embodiment, the smart contract refers to: before businesses conduct transactions with each other, they must define a set of general contracts, covering general terms, data, rules, concept definitions, and processes. These contracts constitute a business model that controls all interactions between both parties together. Using the blockchain network, these contracts can be converted into executable programs. As long as the participants reach an agreement, the rights and obligations established by the smart contract will be automatically executed, and the results cannot be denied.

Figure 1:
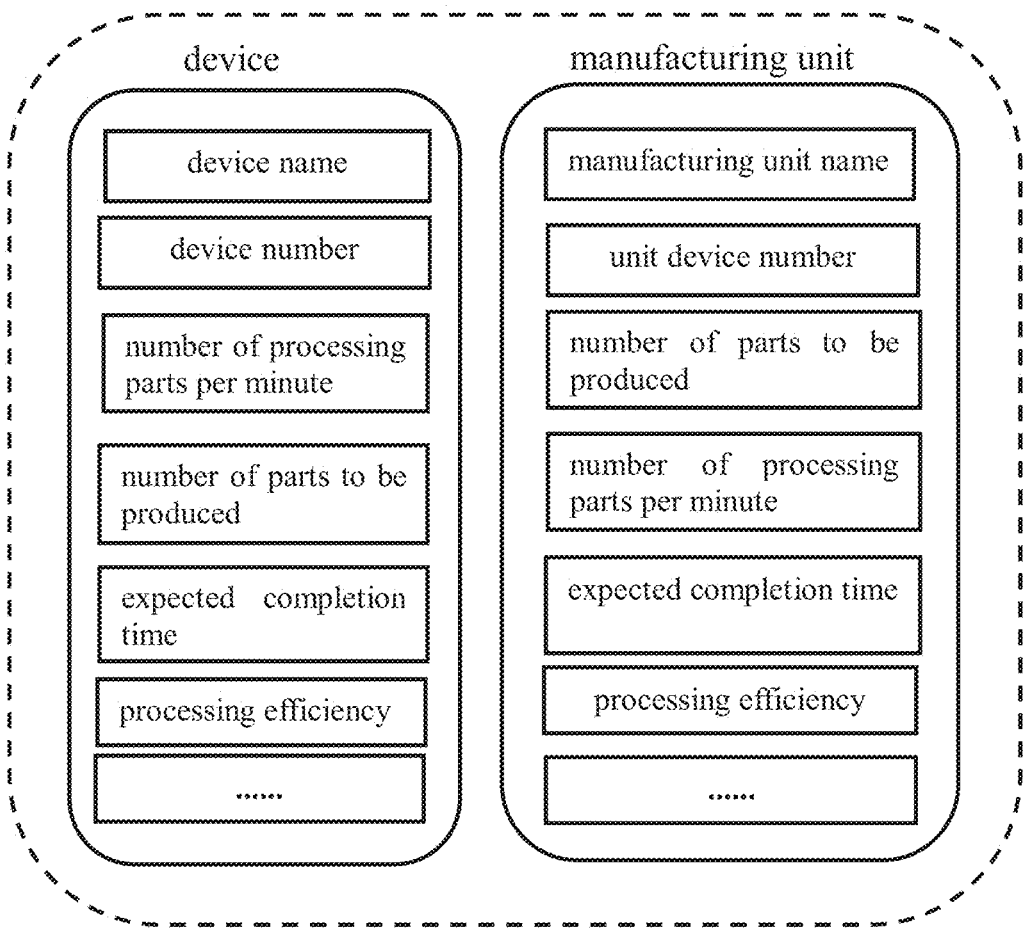
FIG. 1 is the smart contract modeling of the attributes of the manufacturing unit and the attributes of the device in Embodiment 1.

This embodiment proposes a blockchain-enabled edge computing method for production scheduling, which uses the blockchain technology to chain production instructions and device data, and the smart contract dynamically allocates the production tasks of the device in the manufacturing unit according to the device load and production tasks in the manufacturing unit as follows:

S1: a smart contract between a manufacturing unit and a device is modeled: modeling the smart contract between the device and the manufacturing unit, and using the smart contract to perform production scheduling on the device inside the manufacturing unit, wherein one of the manufacturing units comprises a plurality of devices;

the smart contract is established according to the attributes of the manufacturing unit and the attributes of the device, as shown in FIG. 1, wherein the attributes of the manufacturing unit comprise the name of the manufacturing unit, the number of the unit devices, the number of parts to be produced, the number of processing parts per minute, the expected completion time, and the processing efficiency; the attributes of the device comprise the name of the device, the number of the device, the number of processing parts per minute, the number of parts to be produced, the expected completion time, and the processing efficiency.

Figure 2:
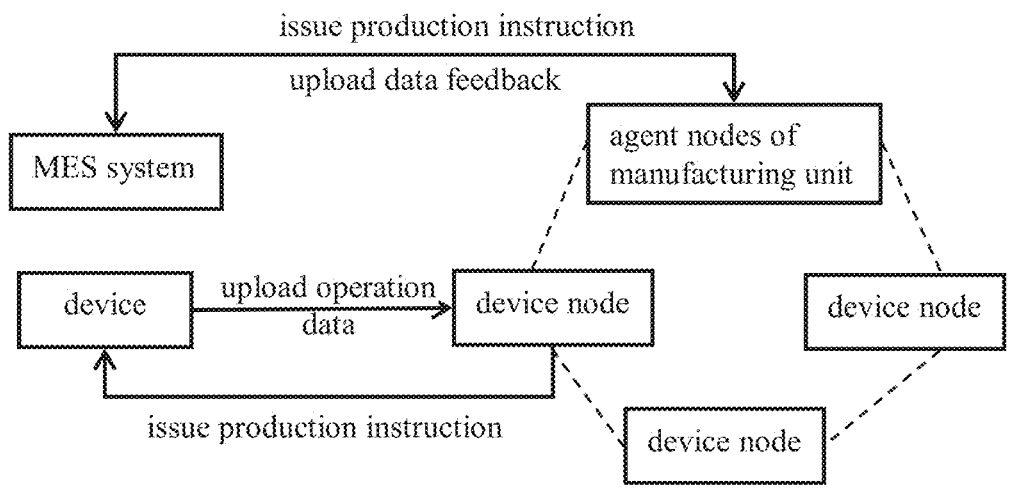
FIG. 2 is the interaction between the MES, the device, and the blockchain network in Embodiment 1.
Figure 3:
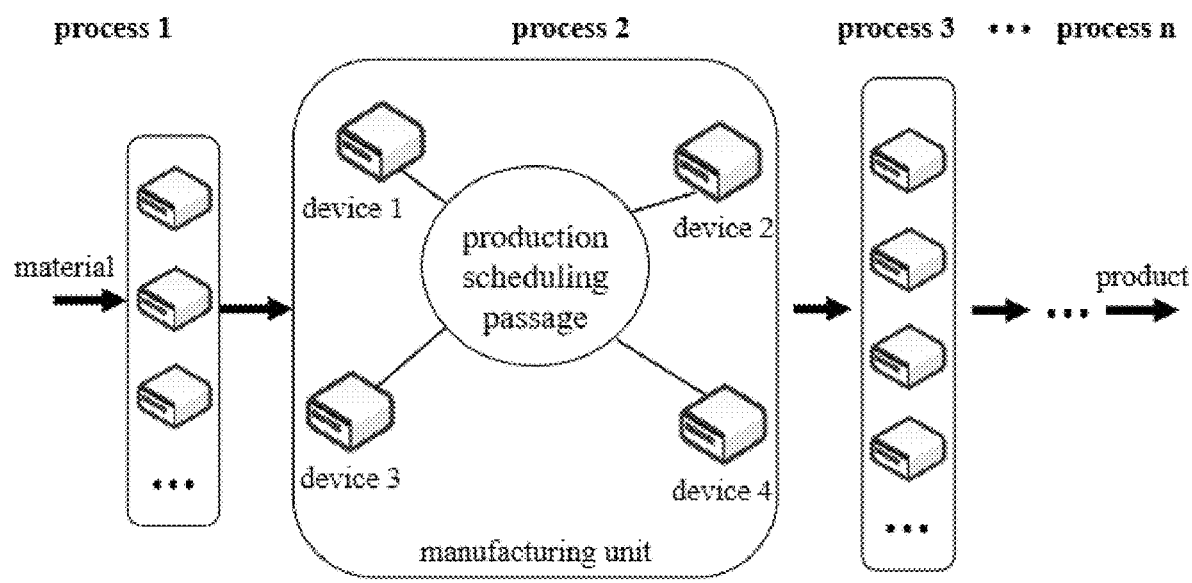
FIG. 3 is the structure of the device assembly line in the production process of the product in Embodiment 1.

S2: Production instructions and device parameters are chained: as shown in FIG. 2, mounting each device on the blockchain operating node, wherein the MES issues production instructions to the nodes of each manufacturing unit, at the same time, the nodes acquire production data of the device through multiple data sources of the device, the operating state data and process parameter data of each device are acquired in real time, and the data is directly chained from the device level so as to ensure the authenticity and validity of the data. The assembly line structure of the product in the production process in this embodiment is shown in FIG. 3, wherein the operating state data comprises operating state signals, running, standby, failure, shutdown, and duration; the process parameter data comprises the current, temperature, and pressure of each process. The multiple data sources of the device comprise a communication interface of a control device such as a PLC, an RFID, a frequency converter, a soft starter, a servo controller, and a control instrument.

S3: The device load is dynamically adjusted using the edge computing: according to the production instructions and device parameters obtained by the manufacturing unit, using edge computing to dynamically adjust the device load, efficiency, and utilization.

1) Production instructions are issued: each manufacturing unit obtains production instructions issued by the MES, and the node of the manufacturing unit assigns production tasks according to the current production efficiency of the device. The goal is to maximize the production efficiency of the manufacturing node (the shortest completion time).

2) The device parameters are acquired: in the production process of the manufacturing unit, sending the relevant operating parameters of the device to the smart contract through multiple data sources, calculating the current processing efficiency of the device according to the operating parameters uploaded by the device so as to obtain the processing efficiency of the manufacturing unit in the process, and calculating whether the estimated makespan of the current manufacturing unit is the shortest in the smart contract, if not, requiring adjustment.

The estimated makespan of the manufacturing unit=the maximum value of the estimated makespan of the device in the manufacturing unit, wherein the estimated makespan of the device=the number of parts to be produced/the number of processing parts per minute+the remaining processing time of the current production workpiece.

3) The device load is dynamically adjusted using the edge computing: calculating the processing efficiency of the device according to the device parameters, and allocating the workpieces to be produced by the smart contract, so as to ensure that the estimated processing time in the manufacturing unit is the shortest and the production efficiency of the manufacturing unit is maximized;

First, the estimated makespan ti of each device and the shortest estimated makespan T of the manufacturing unit are calculated; if $t_i < T$ in the device, the number of workpieces to be processed is increased until $t_i \geq T$, otherwise reducing the number of workpieces to be processed; finally $t_i \approx T$ in each device.

Figure 4:
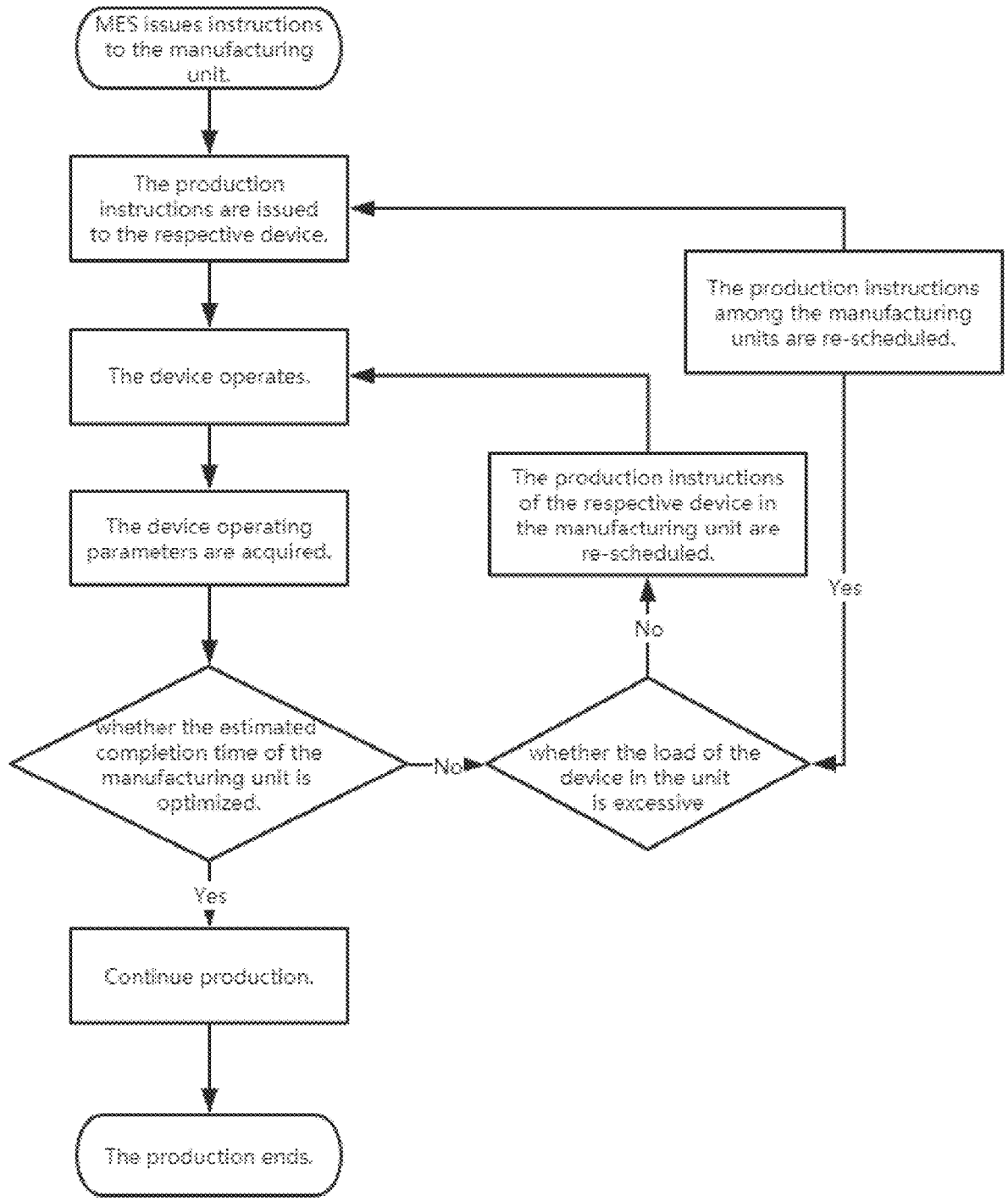
FIG. 4 is a flowchart of the load of the edge computing dynamic adjusting device in Embodiment 1.

At the same time, if the processing efficiency of a certain device is lower than p, the device status is set as abnormal; if the load of the current manufacturing unit device is higher than a threshold k, it is fed back to the MES system for global production task scheduling. The specific operation process is shown in FIG. 4.

In this embodiment, through the combination of blockchain and edge computing, during the manufacturing process, edge computing is used to dynamically adjust the device load in the manufacturing unit, so that when the device load in the manufacturing unit fluctuates, it can be adjusted quickly and dynamically without accumulation of faults which eventually leads to the paralysis of the production scheduling system.

Obviously, the above embodiments of the disclosure are merely examples to clearly illustrate the disclosure, rather than limit the embodiments of the disclosure. Any modification, equivalent replacement, and improvement made within the spirit and principle of the disclosure shall be included in the protection scope of the claims of the disclosure.

What is claimed is:

1. A blockchain-enabled edge computing method for production scheduling, comprising:
providing a blockchain network, wherein the blockchain networks comprises a plurality of blockchain operating nodes;
S1: modeling a smart contract between at least one device and a manufacturing unit, and using the smart contract to perform production scheduling on the device inside the manufacturing unit; wherein one of the manufacturing units comprises a plurality of devices;
S2: mounting each of the devices on one of the blockchain operating nodes to form a device node, and mounting the manufacturing unit on one of the blockchain operating nodes to form a manufacturing unit; wherein a MES (Manufacturing Execution System) issues production instructions to the manufacturing unit node, at the same time, the manufacturing unit node acquire production data of the devices through multiple data sources of the devices, operating state data and process parameter data, production tasks and production efficiency of each device are acquired in real time;
S3: dynamically adjusting the device load, efficiency, and utilization, by edge computing, according to the production instructions and device parameters obtained by the manufacturing unit;
in step S1, the smart contract is established according to the attributes of the manufacturing unit and the attributes of the device; the attributes of the manufacturing unit comprise the name of the manufacturing unit, the number of the unit devices, the number of parts to be produced, the number of processing parts per minute, the expected makespan, and the processing efficiency; and the attributes of the device comprise the name of the device, the number of the device, the number of processing parts per minute, the number of parts to be produced, the expected makespan, and the processing efficiency.

2. The blockchain-enabled edge computing method for production scheduling of claim 1, wherein in step S2, the operating state data comprises operating state signals, running, standby, failure, shutdown, and duration; the process parameter data comprises the current, temperature, and pressure of each process; the multiple data sources of the device comprise a frequency converter, a soft starter, a servo controller, and a control instrument.

3. The blockchain-enabled edge computing method for production scheduling of claim 1, wherein in step S3, the manufacturing unit receives production instructions issued by the MES, and the node of the manufacturing unit assigns production tasks according to the current production efficiency of the device.

4. The blockchain-enabled edge computing method for production scheduling of claim 3, wherein in step S1, the manufacturing unit obtains device parameters as follows: in the production process of the manufacturing unit, sending the relevant operating parameters of the device to the smart contract through multiple data sources, calculating the current processing efficiency of the device according to the operating parameters uploaded by the device, obtaining the processing efficiency of the manufacturing unit in the process, and calculating whether the estimated makespan of the current manufacturing unit is the shortest in the smart contract, if not, requiring adjustment.

5. The blockchain-enabled edge computing method for production scheduling of claim 4, wherein: the estimated makespan of the manufacturing unit=the maximum value of the estimated makespan of the device in the manufacturing unit, wherein the estimated makespan of the device=the number of parts to be produced/the number of processing parts per minute+the remaining processing time of the current production workpiece.

6. The blockchain-enabled edge computing method for production scheduling of claim 5, wherein: the load of the edge computing dynamic adjusting device is specified as follows: calculating the processing efficiency of the device according to the device parameters, and allocating the workpieces to be produced by the smart contract, so that the estimated processing time in the manufacturing unit is the shortest and the production efficiency of the manufacturing unit is maximized; first calculating the estimated makespan $t_i$ of each device and the shortest estimated makespan T of the manufacturing unit; if $t_i<T$ in the device, increasing the number of workpieces to be processed until $t_i \geq T$, otherwise reducing the number of workpieces to be processed; finally $t_i \approx T$ in each device; at the same time, if the processing efficiency of a certain device is lower than p, setting the device status as abnormal; if the load of the current manufacturing unit device is higher than k, feeding back to the MES for global production task scheduling.

* * * * *